(12) United States Patent
Andersen et al.

(10) Patent No.: US 9,121,385 B2
(45) Date of Patent: Sep. 1, 2015

(54) WIND TURBINE AND A METHOD FOR PITCHING A BLADE OF A WIND TURBINE

(75) Inventors: Jesper Lykkegaard Andersen, Hornslet (DK); Jens Bay Madsen, Arhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 798 days.

(21) Appl. No.: 13/301,122

(22) Filed: Nov. 21, 2011

(65) Prior Publication Data

US 2012/0134806 A1     May 31, 2012

Related U.S. Application Data

(60) Provisional application No. 61/417,335, filed on Nov. 26, 2010.

(30) Foreign Application Priority Data

Nov. 26, 2010 (DK) .................................. 2010 70510

(51) Int. Cl.
    *F03D 7/02*           (2006.01)
    *F03D 1/06*           (2006.01)

(52) U.S. Cl.
    CPC ............ *F03D 7/0224* (2013.01); *F03D 1/0658* (2013.01); *F05B 2270/604* (2013.01); *Y02E 10/721* (2013.01); *Y02E 10/723* (2013.01)

(58) Field of Classification Search
    CPC ................. F03D 1/0658; F03D 7/0224; F05B 2270/604; Y02E 10/723; Y02E 10/721
    USPC ............ 415/4.3, 4.5, 908; 416/153, 154, 155, 416/156, 158, 174, 205
    See application file for complete search history.

(56) References Cited

U.S. PATENT DOCUMENTS

| 4,348,155 A | 9/1982 | Barnes et al. |
| 4,715,782 A * | 12/1987 | Shimmel .................... 416/32 |

(Continued)

FOREIGN PATENT DOCUMENTS

| AU | 20039337882 | 10/2010 |
| CA | 2 667 849 | 12/2009 |

(Continued)

OTHER PUBLICATIONS

Jacob Dahl Jensen; 1st Technical Examination and Search Report issued in priority Denmark Application No. PA 2010 70510; Jul. 22, 2011; 6 pages; Denmark Patent and Trademark Office.

(Continued)

*Primary Examiner* — Edward Look
*Assistant Examiner* — Juan G Flores
(74) *Attorney, Agent, or Firm* — Wood, Herron & Evans, LLP

(57) ABSTRACT

A wind turbine includes at least one wind turbine blade assembly. The blade assembly includes a blade and a pitch bearing arranged between the blade and a hub of the wind turbine, the blade assembly further including two or more hydraulic pitch cylinders for pitching the blade in relation to the hub. The two or more hydraulic pitch cylinders are arranged to expand in the same angular direction around the rotational axis of the pitch bearing. A method for pitching a blade of a wind turbine includes connecting a first end of the hydraulic pitch cylinders directly or indirectly to the hub; connecting a second end of the hydraulic pitch cylinders directly or indirectly to the blade; and expanding or contracting the hydraulic pitch cylinders in the same angular direction in relation to the rotational axis of the pitch bearing.

18 Claims, 7 Drawing Sheets

(56) References Cited

U.S. PATENT DOCUMENTS

| | | | |
|---|---|---|---|
| 6,030,177 | A | 2/2000 | Hager |
| 6,604,907 | B1 * | 8/2003 | Lehnhoff .................... 416/156 |
| 6,783,326 | B2 * | 8/2004 | Weitkamp et al. ............... 416/1 |
| 2003/0147751 | A1 | 8/2003 | Wobben |
| 2011/0020136 | A1 * | 1/2011 | Numajiri .................... 416/246 |
| 2011/0187104 | A1 * | 8/2011 | Numajiri et al. ............... 290/44 |

FOREIGN PATENT DOCUMENTS

| | | | |
|---|---|---|---|
| DE | 102006012009 A1 | 9/2007 | |
| WO | 2007/006301 | 1/2007 | |
| WO | WO-2009/150713 A1 * | 12/2009 | ................ F03D 7/04 |
| WO | WO-2010/116520 A1 * | 10/2010 | ............. F03D 11/00 |

OTHER PUBLICATIONS

European Patent Office, European Search Report issued in European Application No. 11190481.9 dated Dec. 4, 2013.

* cited by examiner

WIND TURBINE AND A METHOD FOR PITCHING A BLADE OF A WIND TURBINE

CROSS-REFERENCE TO RELATED APPLICATIONS

This application claims priority under 35 U.S.C. §119(a) to DK Application No. PA 2010 70510, filed Nov. 26, 2010. This application also claims the benefit of U.S. Provisional Application Ser. No. 61/417,335, filed Nov. 26, 2010. Each of these applications is incorporated by reference herein in its entirety.

TECHNICAL FIELD

The invention relates to a wind turbine comprising at least one wind turbine blade assembly. The blade assembly includes a blade, a pitch bearing arranged between the blade and a hub of the wind turbine and further includes two or more hydraulic pitch cylinders for pitching the blade in relation to the hub. The invention further relates to a method for pitching a blade of a wind turbine.

BACKGROUND

A wind turbine known in the art comprises a wind turbine tower and a wind turbine nacelle positioned on top of the tower. A wind turbine rotor with three wind turbine blades is connected to the nacelle through a low speed shaft, as illustrated in FIG. 1.

Modern wind turbines control the load on the rotor by pitching the blades in and out of the incoming wind. The blades are pitched to optimize the power output or to protect the wind turbine from damaging overloads.

To perform the pitch, each blade is provided with a pitching arrangement comprising a pitch bearing between the hub and the blade, and, for example, a hydraulic cylinder to provide the force for pitching the blade and maintaining it in a given position.

As the size of the modern wind turbines increases, the torque needed to pitch the blades is also increased, and the simple solution to this problem would be to just increase the size of the pitch mechanism. But nowadays, the hydraulic cylinder performing the pitch operation is already so large that if it has to be increased any further it would have to be specially designed and manufactured, thereby making it very expensive.

From the Canadian patent application CA 2 667 849 A1 and the U.S. Pat. No. 4,348,155 A it is therefore known to provide each wind turbine blade with a pitch mechanism comprising more than one hydraulic cylinder to pitch each blade. The use of more than one hydraulic cylinder reduces the size of each cylinder and enable that standard off-the-shelf equipment can be used.

But these solutions entail a disadvantageous load distribution.

Therefore one aspect of the invention is to provide for an advantageous wind turbine blade pitching technique having an improved load distribution.

SUMMARY

One embodiment of the invention provides for a wind turbine comprising at least one wind turbine blade assembly. The blade assembly includes a blade and a pitch bearing arranged between the blade and a hub of the wind turbine, the blade assembly further including two or more hydraulic pitch cylinders for pitching the blade in relation to the hub. The two or more hydraulic pitch cylinders each comprise a first point of attack being fixed towards the blade and a second point of attack being fixed towards the hub. Moreover, the two or more hydraulic pitch cylinders are arranged to expand in the same angular direction around the rotational axis of the pitch bearing.

As previously explained, it may be advantageous to provide a pitch mechanism with multiple hydraulic pitch cylinders in that the size of each cylinder can thereby be reduced and inexpensive off-the-shelf equipment may be used.

Furthermore, a hydraulic cylinder comprises two internal chambers divided by a piston in the cylinder housing. However, these two chambers are not identical in that the front chamber comprises the piston rod extending out of the front of the cylinder housing. This piston rod is not present in the rear chamber, which means that the cylinder is not able to provide as much force when it contracts as when it expands. This is because the area on which the oil pushes on the piston is reduced by the cross-sectional size of the piston rod in the front chamber.

If the hydraulic cylinders are arranged so that they all contract and expand substantially uniformly in the same angular direction, it is always the same chamber of all the cylinders that has to be pressurised. This means that the cylinders provide substantially the same pressure, thereby creating a symmetrical load situation and avoiding stress concentrations.

Furthermore, if the cylinders are not arranged so that they all contract and expand substantially uniformly in the same angular direction, it is impossible or at least very difficult to operate the cylinders in parallel (hydraulically). This is because if the cylinders are provided with the same oil pressure, the cylinder that expands will always provide a greater load than the cylinder that contracts. Additionally, if the cylinders are not connected in parallel hydraulically, the control of the cylinders will be much more complicated and require more valves to operate the cylinders individually.

That the hydraulic pitch cylinders each comprise a first point of attack being fixed towards the blade and a second point of attack being fixed towards the hub in practice means that the hydraulic pitch cylinders are physically coupled in parallel in that a piston end of the hydraulic pitch cylinders is coupled directly or indirectly to the blade and a cylinder housing end of the hydraulic pitch cylinders is coupled directly or indirectly to the hub or visa versa.

Physically coupling the hydraulic cylinders in parallel is advantageous in that it provides for a more symmetrical load distribution whereby unwanted stress concentrations are reduced or avoided.

It should be emphasised that the term "directly" in this context means that the hydraulic cylinder, including whatever fittings it may comprise, is coupled directly to the blade or the hub whereas the term "indirectly" in this context means that the hydraulic cylinder, including whatever fittings it may comprise, is coupled indirectly to the blade or the hub through some intermediate part, such as a bearing ring, a lever gear, a connection part or some other part connecting the hydraulic cylinder indirectly to the hub or the blade.

It should be noted that the term "arranged to expand in the same angular direction around the rotational axis of the pitch bearing" means that the two or more hydraulic pitch cylinders are each arranged to apply a pitch force to the blade, wherein the pitch forces result in pitch torque vectors having the same direction when the cylinders are expanding. More particularly, when the cylinders are made longer due to increased oil pressure in a chamber inside the hydraulic cylinders, making the cylinders expand, in that the piston rod of the cylinder protrudes further out of an end of the cylinder housing, all the cylinders will aid in pitching the blade in a given direction. And likewise, when all the cylinders contract they will all act in the same circumferential direction making the blade turn in the opposite direction.

However, it should also be noted that the term "arranged to expand in the same angular direction around the rotational axis of the pitch bearing" does not exclude that one or more of the cylinders are reversed in relation to the other cylinders. If the cylinders are all mounted to expand in the same angular direction, they will all have to expand, and thereby pressurize the same chamber in all the cylinders, to move the blade in a given direction, no matter if some of them are reversed.

By the term "point of attack being fixed towards" is to be understood that the cylinders engaging areas or the places where the cylinders are connected to the surrounding structure are stationary or motionless in relation to the blade or the hub, respectively. More particularly, the term means the hydraulic pitch cylinders are at one end (e.g., at the cylinder housing) connected directly or indirectly to the hub so that this point of attack substantially does not move in relation to the hub, and at the other end (e.g., around the piston rod end) is connected directly or indirectly to the blade so that this point of attack substantially does not move in relation to the blade or visa versa.

In an aspect of the invention, the two or more hydraulic pitch cylinders are evenly distributed around the rotational axis of the pitch bearing.

Arranging the hydraulic pitch cylinders so that they are evenly distributed around the axis of rotation of the pitch bearing is advantageous in that the risk of unwanted load concentrations in the pitch bearing, the hub, the blade and/or any other parts in load transmitting connection with the pitch cylinders is thereby reduced.

It should be emphasised that the term "evenly distributed" is to be understood as the angular distance between the hydraulic pitch cylinders is substantially uniform, i.e., if the pitch mechanism comprises two hydraulic pitch cylinders, the angular distance between the cylinders is approximately 180°; if the pitch mechanism comprises three hydraulic pitch cylinders, the angular distance between the cylinders is approximately 120°; if the pitch mechanism comprises four hydraulic pitch cylinders the angular distance between the cylinders is approximately 90°, and so on.

In an aspect of the invention, the two or more hydraulic pitch cylinders are suspended directly between the same two parts.

By suspending all the hydraulic pitch cylinders directly between the same two parts of the rotor it is thereby ensured that the risk of unwanted load concentrations is reduced. More particularly, it is avoided that the load of the hydraulic pitch cylinders shall be transformed or transferred through different paths, which could entail differences in loss and thereby differences in impact. This in turn could lead to an asymmetric load situation in which unwanted load concentrations could occur.

In an aspect of the invention, the blade assembly includes three individual hydraulic pitch cylinders.

It may be particularly advantageous if the pitch mechanism of a wind turbine blade comprises exactly three hydraulic pitch cylinders.

The hydraulic pitch cylinders are highly strained during the operation of the wind turbine and the hydraulic pitch cylinders are therefore prone to breakdown. It is therefore known to use hydraulic pitch cylinders of an exceptional high quality to ensure that these cylinders can last the entire life of the wind turbine. But such high quality cylinders are very expensive and the risk of breakdown is still not completely eliminated.

It is therefore also known to provide the pitch mechanism with two individual hydraulic pitch cylinders. If one hydraulic pitch cylinder fails the other cylinder can still maintain the pitch operation until the next service. However, if one hydraulic pitch cylinder would have to be able to maintain the pitch operation alone, it would have to be dimensioned for this purpose. This means that during normal operation, the pitch mechanism would be provided with twice the capacity needed. This entails an expensive pitch mechanism.

But, if the pitch mechanism comprises exactly three hydraulic pitch cylinders, each cylinder could be designed to have approximately 50% of the required capacity of the pitch mechanism so that if one pitch cylinder failed, the remaining two cylinders could continue with full capacity or they could, for example, be dimensioned to have 40% of the required capacity of the pitch mechanism. In this way, if one of the pitch cylinders failed, the remaining two cylinders could continue with 80% of the full capacity, which would be sufficient to operate the wind turbine in a normal or a close to normal operational state for a long period of time. For example, the two remaining cylinders could operate the wind turbine until the next planned service or at least until service personnel arrives at the wind turbine.

One could then argue that the more hydraulic pitch cylinders the pitch mechanism comprises the better because the smaller excess capacity it would have during normal operation. However, the space in the hub is very limited and the space at each pitch bearing is particularly limited so there is not enough room to fit more than three hydraulic pitch cylinders.

Furthermore, the pitch mechanism of a wind turbine will have to pitch the blades within an angular range of about 110° so it is physically not possible to fit more than three hydraulic pitch cylinders if each of them has to push and pull the blade over a 110° range.

In an aspect of the invention, the two or more hydraulic pitch cylinders are hydraulically coupled in parallel.

Coupling the pitch cylinders hydraulically in parallel, so that all the cylinders are supplied the same pressure from the same source, may be advantageous in that excess strain and unwanted stress concentrations are reduced or avoided because if one of the cylinders was particularly loaded due to asymmetric load, deformation, wear or other, the extra pressure supplied to pitch the blade would be distributed to all the cylinders. Thus, all the cylinders would "share" the task of overcoming the extra load and thereby also reduce the risk of a single cylinder being overloaded. Such a load sharing operation could also be performed if the cylinders were coupled in series, but the control system would be much more complex and require more valves, load sensors, etc.

In an aspect of the invention, the two or more hydraulic pitch cylinders are connected to the blade through a lever gear.

If the hydraulic cylinders were connected directly between the hub and the blade periphery, the blade would only move approximately 100 mm for every 100 mm motion of the cylinder piston. For normal pitch operation of a modern wind turbine, this would require cylinders with a very long stroke, which would be expensive and difficult or impossible to fit in the limited space inside the hub. However, by connecting the cylinders to the blades through a lever gear, it is possible to gear the motion of the piston so that, for example, 100 mm movement of the piston would produce a 200 mm movement at the blade periphery. Accordingly, the needed stroke of the cylinders is reduced so the cost can be reduced and the pitch mechanism design can be optimised.

In an aspect of the invention, the two or more hydraulic pitch cylinders are rotatably connected to the hub and rotatably connected to the blade.

Rotatably connecting the pitch cylinders to the hub and the blade is advantageous in that it allows for a more simple pitch mechanism design and because the risk of unwanted stress concentrations is reduced.

In an aspect of the invention, one of the hydraulic pitch cylinders' point of attack is located at a radial distance of between 10% and 90%, preferably between 20% and 80% and most preferred between 30% and 70% of the outer radius of the pitch bearing from the rotational axis of the pitch bearing.

The closer the cylinder's point of attack is to the rotational axis of the pitch bearing, the more force is needed to produce a given pitch motion, which would locally produce very high strain to the pitch mechanism and the hub, and the further away the cylinder's point of attack is from the rotational axis of the pitch bearing, the longer the cylinder's stroke would have to be, thereby increasing the cost and complicating the pitch mechanism design.

The present distance ranges therefore provide for an advantageous relationship between reducing strain and reducing cost/simplify design.

In an aspect of the invention, the two or more hydraulic pitch cylinders all have substantially the same stroke.

If one cylinder is longer than the rest of the pitch cylinders of a given blade, it will continue to pull or push the blade after the other cylinders have reached their extreme position, if not stopped otherwise. Using cylinders having the same stroke is therefore advantageous in that it enables a simpler cylinder control and it ensures a more symmetrical and even load distribution.

In an aspect of the invention, the two or more hydraulic pitch cylinders all have substantially the same diameter.

If all the hydraulic pitch cylinders have substantially the same diameter, they will all produce substantially the same force at a given oil pressure. This is advantageous in that it will ensure a more symmetrical and even load distribution.

It should be noted that by term "the same diameter" is to be understood the same inner diameter of the cylinder housing or the same outer diameter of the cylinder piston. It should also be noted that inherently, it also means that the piston rod diameter is the same for all the cylinders since the diameter of the piston and the diameter of the piston rod inherently has to be consistent.

In an aspect of the invention, the two or more hydraulic pitch cylinders are arranged at or adjacent to the pitch bearing.

Since the torque produced by the hydraulic pitch cylinders has to be transferred across the pitch bearing to pitch the blades, it is advantageous that the hydraulic pitch cylinders are arranged at or in close proximity of the pitch bearing to simplify the pitch mechanism design and to reduce the "arm" in the axial direction, which could produce an unwanted torque in an axial plane.

In an aspect of the invention, the pitch bearing comprises at least one inner ring, at least one centre ring and at least one outer ring, wherein the centre ring is radially displaced outwards in relation to the inner ring and the outer ring is radially displaced outwards in relation to the centre ring and wherein at least one row of rolling elements is arranged between the inner ring and the centre ring and at least one further row of rolling elements is arranged between the centre ring and the outer ring.

Three ring bearings are more complex to mount and they are more expensive than traditional two-ring bearings. Nevertheless, using multiple hydraulic pitch cylinders in combination with a pitch bearing comprising three concentric bearing rings is particularly advantageous in that this bearing type is more efficient at transferring radial loads in both radial directions, whereby deformation originating from the load exerted by the multiple hydraulic pitch cylinders can be accepted instead of compensated for, thus reducing the overall cost of the pitch arrangement and increasing the durability.

In an aspect of the invention, the wind turbine further comprises a number of valves arranged to hydraulically isolate each of the two or more hydraulic pitch cylinders.

If a hydraulic hose bursts, if a pitch cylinder starts leaking, or if any other similar type of failure occurs, it is advantageous that each of the pitch cylinders can be individually isolated from the hydraulic circuit so that the remaining cylinders may continue substantially normal operation until the next planned service, until emergency service can be performed, or in severe cases, the failing cylinder can be isolated to enable that the wind turbine can be shut down by feathering the blades.

A further embodiment of the invention provides for a method for pitching a blade of a wind turbine. The method comprising the steps of:
 connecting a first end of two or more hydraulic pitch cylinders directly or indirectly to a hub of the wind turbine,
 connecting a second end of the two or more hydraulic pitch cylinders directly or indirectly to the blade, and
 expanding or contracting the two or more hydraulic pitch cylinders in the same angular direction in relation to a rotational axis of a pitch bearing of the blade.

Expanding or contracting the two or more hydraulic pitch cylinders in the same angular direction is advantageous in that it enables that the loads provided by the pitch cylinders and the blade can be more advantageously distributed in the pitch mechanism and the surrounding structures.

In an aspect of the invention, the wind turbine is a wind turbine according to any of the above mentioned.

BRIEF DESCRIPTION OF THE DRAWINGS

The invention will be described in the following with reference to the figures in which.

DETAILED DESCRIPTION

Figure 1:
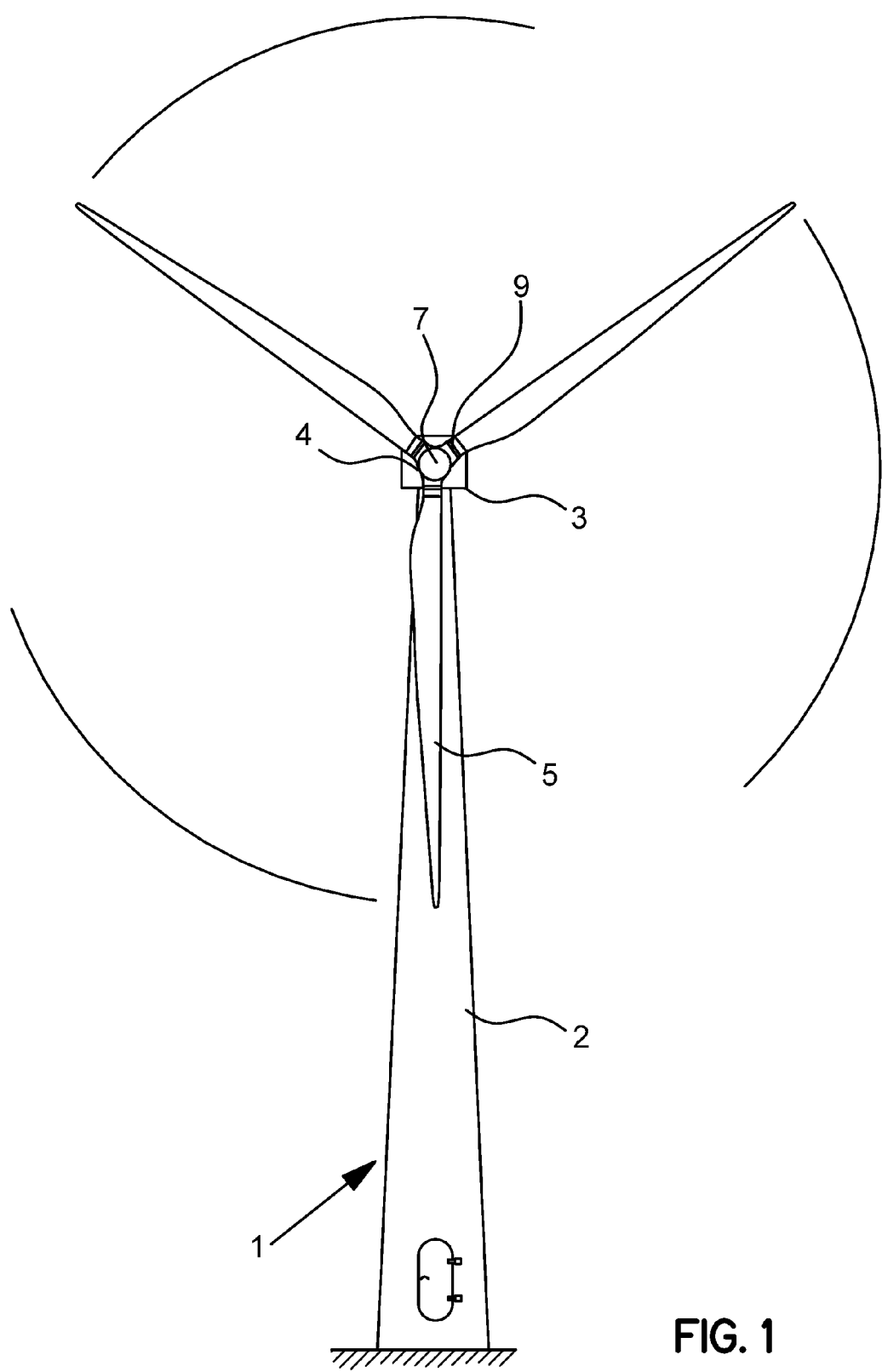
FIG. 1 illustrates a large modern wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
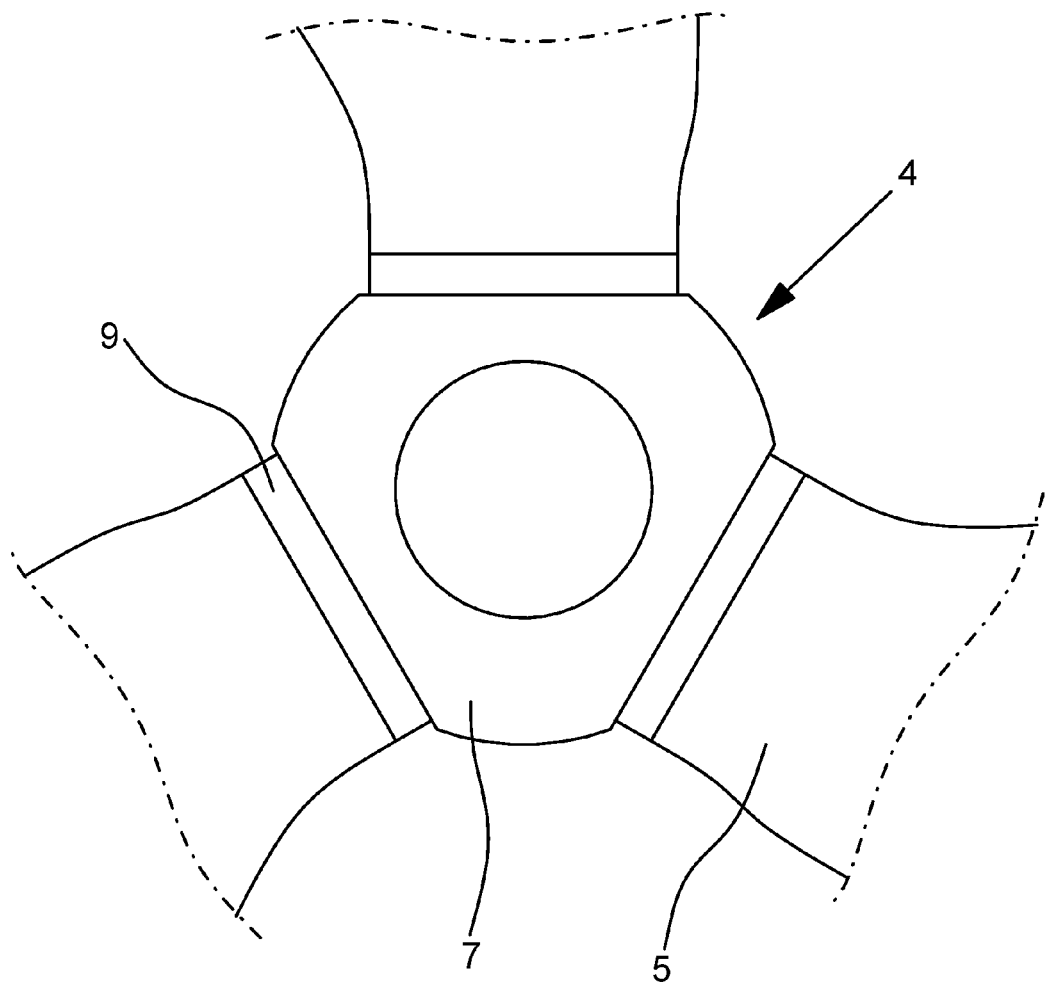
FIG. 2 illustrates a wind turbine hub comprising three blades as seen from the front.

FIG. 2 illustrates a wind turbine rotor 4 comprising a hub 7 and three blades 5 as seen from the front.

As illustrated, the pitch bearings 9 are arranged between the blades 5 and the hub 7 to enable that the blades 5 can be rotated around their longitudinal axis and to transfer forces mainly from three different sources. The blades 5 (and the bearings 9 themselves of course) are under constant influence of the force of gravitation. The direction of the gravitational force varies depending on the blade's 5 position, inducing different loads on the pitch bearings 9. When the blade is in motion, the bearing 9 is also under influence of a centrifugal force, which mainly produces an axial pull in the bearing 9. Finally, the bearings 9 are under influence of the wind load on the blades 5. This force is by far the greatest load on the bearings 9 and it produces a massive moment, which the bearings 9 have to stand.

The load on and from all the pitch bearings 9 has to be transferred to the hub 7 and further into the rest of the wind turbine 1 and the pitch bearing 9 at the same time has to enable that the blade 5 can be pitched.

In this embodiment, the rotor 4 comprises three blades 5, but in another embodiment, the rotor 4 could comprise one, two, four or more blades 5.

In this embodiment, the wind turbine 1 is a pitch regulated wind turbine 1, but in another embodiment, the wind turbine could just as well be an active stall regulated wind turbine 1 since both pitch regulated wind turbines 1 and active stall regulated wind turbines 1 comprise a pitch mechanism 6 for pitching the blades 5.

Figure 3:
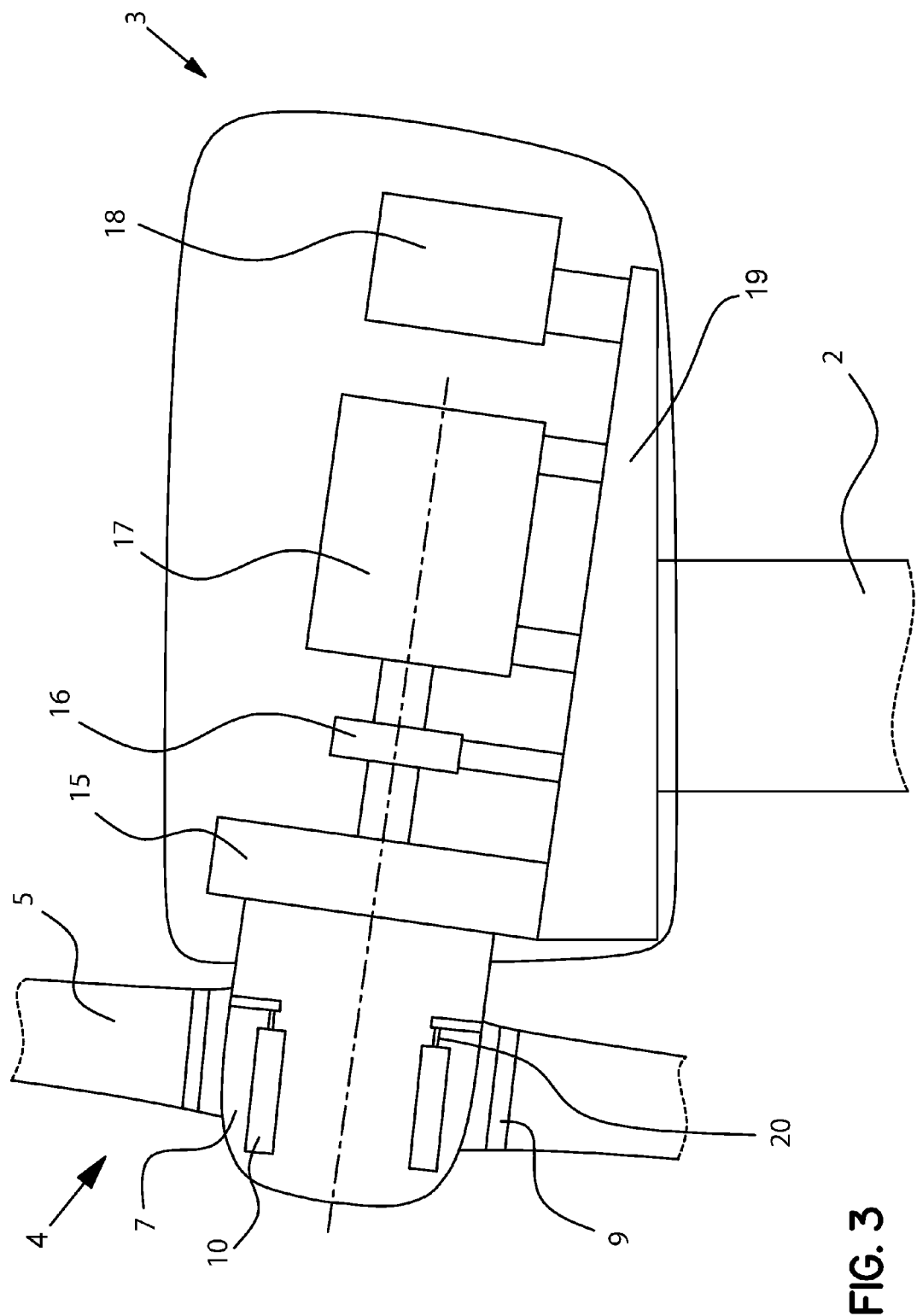
FIG. 3 illustrates a simplified cross section of a wind turbine nacelle as seen from the side.

FIG. 3 illustrates a simplified cross section of a nacelle 3 of a prior art wind turbine 1, as seen from the side. Nacelles 3 exist in a multitude of variations and configurations but in most cases, the drive train in the nacelle 3 almost always comprises one or more of the following components: a gearbox 15, a coupling (not shown), some sort of braking system 16 and a generator 17. A nacelle 3 of a modern wind turbine 1 can also include a converter 18 (also called an inverter) and additional peripheral equipment, such as further power handling equipment, control cabinets, hydraulic systems, cooling systems and more.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment, the load carrying nacelle structure 19 only extends along the bottom of the nacelle 3, for example, in the form of a bed frame to which some or all the components 15, 16, 17, 18 are connected. In another embodiment, the load carrying structure 19 could comprise a gear bell which through a main bearing (not shown) could transfer the load of the rotor 4 to the tower 2. Furthermore, the load carrying structure 19 could comprise several interconnected parts such as latticework.

In the illustrated embodiment, the blades 5 of the wind turbine 1 are connected to the hub 7 through pitch bearings 9, enabling that the blades 5 can rotate around their longitudinal axis.

In this embodiment, the pitch mechanism 6 comprise a rotating device or means for rotating the blades 5 in the form of hydraulic cylinders 10 connected to the hub 7 and the respective blades 5.

Figure 4:
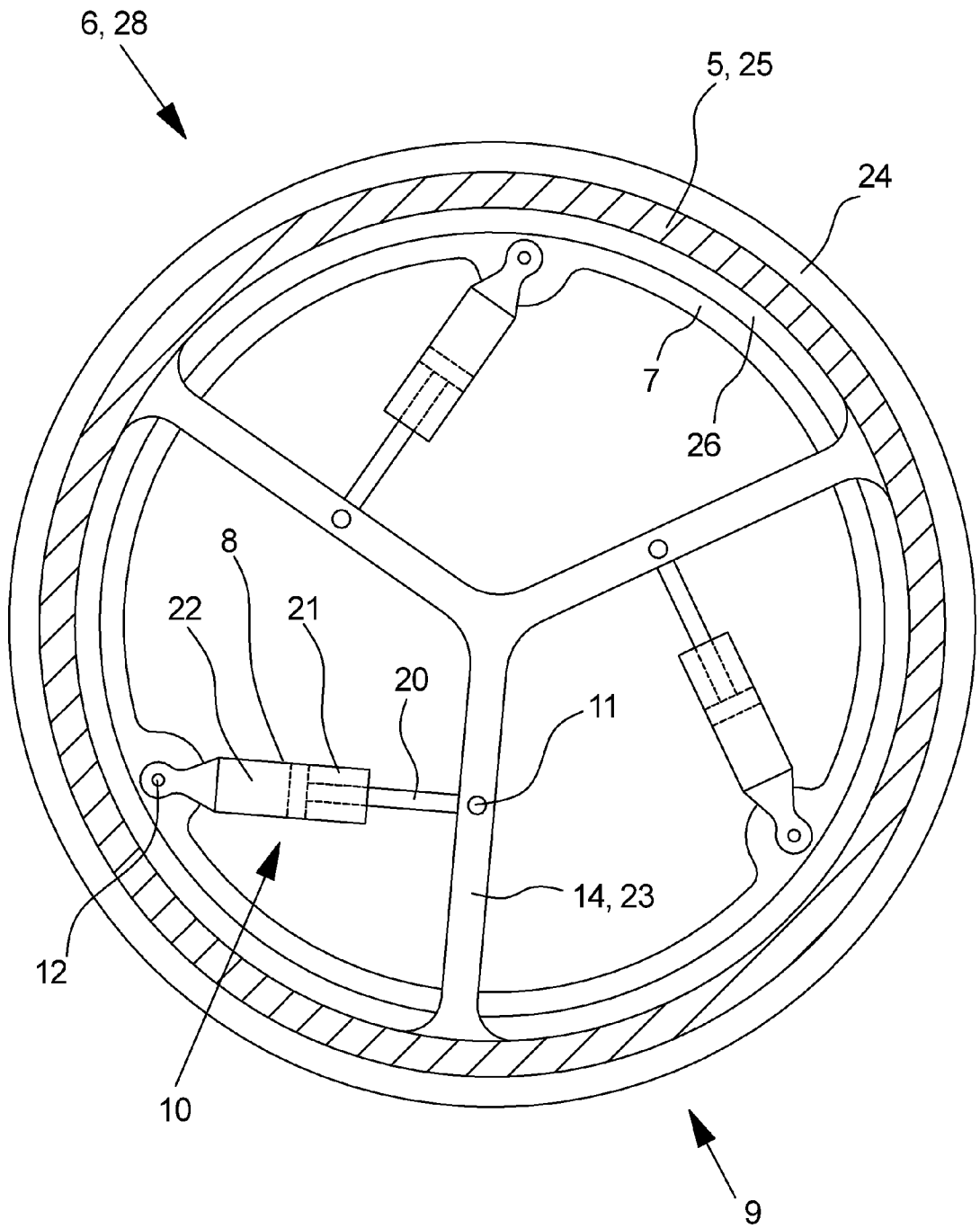
FIG. 4 illustrates an embodiment of a pitch mechanism comprising three hydraulic cylinders as seen from the top.

FIG. 4 illustrates an embodiment of a pitch mechanism 6 comprising three hydraulic cylinders 10 as seen from the top.

In this embodiment, the wind turbine comprises a number of blade assemblies 28 connected to the hub 7 of the wind turbine. Each blade assembly 28 comprises a blade 5, a pitch bearing 9 and a pitch mechanism 6, which in this case comprises three hydraulic cylinders 10. In another embodiment, the pitch mechanism 6 could comprise another number of hydraulic cylinders 10 such as two, four, five or more.

In this embodiment, the hydraulic cylinders 10 are physically coupled in parallel so that all the hydraulic cylinders 10 act directly between the same two parts in that the piston end 11 of all the hydraulic cylinders 10 is rotatably coupled directly to a connection part 14 of the blade assembly 28, and thereby indirectly to the blade 5, and the cylinder housing end 12 of all the hydraulic cylinders 10 is rotatably coupled directly to the hub 7.

However, in another embodiment, only some of the hydraulic cylinders 10 would be physically coupled in parallel, while other hydraulic cylinders 10 would be physically coupled in series (e.g., coupled end to end) and some or all of the hydraulic cylinders 10 could be mounted differently so that one end 11, 12 of one or more of the hydraulic cylinders 10 would be directly connected to the hub 7, a ring 24, 25, 26 of the pitch bearing 9, or some intermediate part or fitting connected to one or more of these parts 7, 24, 25, 26; and the other end 11, 12 of these one or more hydraulic cylinders 10 would be directly connected to the blade 5, the connection part 14, a ring 24, 25, 26 of the pitch bearing 9, or some intermediate part or fitting connected to one or more of these parts 5, 14, 24, 25, 26.

Hydraulic cylinders 10 are very robust and particularly suited for the more or less constantly reciprocating motion needed to pitch a wind turbine blade 5 and since substantially any kind of hydraulic pitch system comprising a hydraulic cylinder 10 will inherently comprise a brake function enabling that a certain pitch angle can be maintained over time, hydraulic cylinders 10 are advantageous for use as pitch drives in a wind turbine pitch mechanism 6.

Furthermore, energy backup for operating the hydraulic cylinders 10 in an emergency situation, such as grid failure, operational failures etc., is relatively simple and inexpensive in that it would only need one or more pressure accumulators to be installed to, for example, ensure that the blades 5 could be pitched to a safe position in case of failure.

In this embodiment, the piston end 11 of the hydraulic cylinders 10 is rotatably connected to the connection part 14 and the cylinder housing end 12 is, by means of a fitting, mounted at the far end of the cylinder housing 8, rotatably connected to the hub 7. In another embodiment, the cylinder housing end 12 could be connected to the hub 7 (directly or indirectly) by means of a fitting placed elsewhere on the cylinder housing 8, such as at the middle of the cylinder housing 8 or at the front end of the cylinder housing 8 from which the piston rod 20 extends.

In this embodiment, the hydraulic cylinders 10 are evenly distributed around the axis of rotation of the pitch bearing 9, but in another embodiment, the multiple hydraulic cylinders 10 could be distributed differently, for example, due to limited space, to provide easier access to the hydraulic cylinders 10 from the nacelle 3 or other.

In this embodiment, the hydraulic cylinders 10 are hydraulically coupled in parallel in that the same chamber 21, 22 in the cylinder housings 8 of all the hydraulic cylinders 10 are supplied from the same source, i.e., the front chamber 21 (the internal chamber comprising the piston rod 20) of the cylinders 10 are all supplied from the same port on the same valve, from the same ports on the same valves, from the same pump (s) or from the same similar source. Similarly, the rear chamber 22 (the internal chamber which does not comprise the piston rod 20) of the cylinders 10 are all supplied from the same port on the same valve, from the same ports on the same valves, from the same pump(s) or from the same similar source.

However, in another embodiment, some or all of the cylinders 10 could be supplied from different sources thereby allowing the cylinders 10 to impact the blade 5 with different force.

In this embodiment, the hydraulic cylinders 10 are connected to the blade 5 through a lever gear 23 in that the cylinders 10 are connected to the blade 5 through a connection part 14 so that the cylinders' point of attack on this connection part 14 is moved to a radial distance of approximately 50% of the outer radius of the pitch bearing 9 from the rotational axis of the pitch bearing 9. Hereby is enabled that when the cylinder 10 expands, e.g., 100 mm, this extension will lead to an approximately 200 mm movement of the blade 5 at the periphery of the blade root, in that the connection part 14 acts as a lever gear 23.

However, it should be noted that the same lever gear effect could be achieved if one of the hydraulic cylinder's point of attack was arranged near the blade 5 periphery, i.e., at or near the outer radius of the pitch bearing 9, and the hydraulic cylinder's other point of attack was arranged, for example, between 30% and 70% of the outer radius of the pitch bearing 9 from the rotational axis of the pitch bearing 9 on the hub 7 or more likely on a part, such as a connection part, being fixed towards the hub 7.

In another embodiment, some or all of the cylinders 10 could attack the connection part 14 at another distance from the rotational axis of the pitch bearing 9, thereby reducing or increasing the gearing effect of the lever gear 23 accordingly.

In this embodiment, all the cylinders 10 are identical and they are all connected similarly and therefore they all affect the connection part 14, the hub 7 and the pitch bearing 9 substantially uniformly. In another embodiment, however, some or all of the hydraulic cylinders 10 could vary in size or type or some or all of the hydraulic cylinders 10 could be mounted differently so that their effect on the connection part 14, the hub 7 and/or the pitch bearing 9 would be non-uniform.

With the given stroke of the illustrated hydraulic cylinders 10 and the given gearing provided by the connection part 14, which in this case acts as a lever gear 23, the hydraulic cylinders 10 are able to turn the blade 5 approximately 110° around its longitudinal axis. In another embodiment, the stroke could be different or the gearing could be different, thereby changing the pitch range accordingly.

In this embodiment, the hydraulic cylinders 10 are arranged so that they all contract and expand substantially uniformly in the same angular direction around the pitch bearing's rotational axis, i.e., the axis around which one or more of the bearing rings 24, 25, 26 turns when the blade 5 is pitched in relation to the hub 7. In this embodiment, the cylinders 10 are arranged so that when they are expanded, the blade 5 turns counter-clockwise, and when they contract, the blade 5 turns clockwise. However, in another embodiment, the cylinders 10 could be arranged to turn the blade 5 clockwise when they expand.

Figure 5:
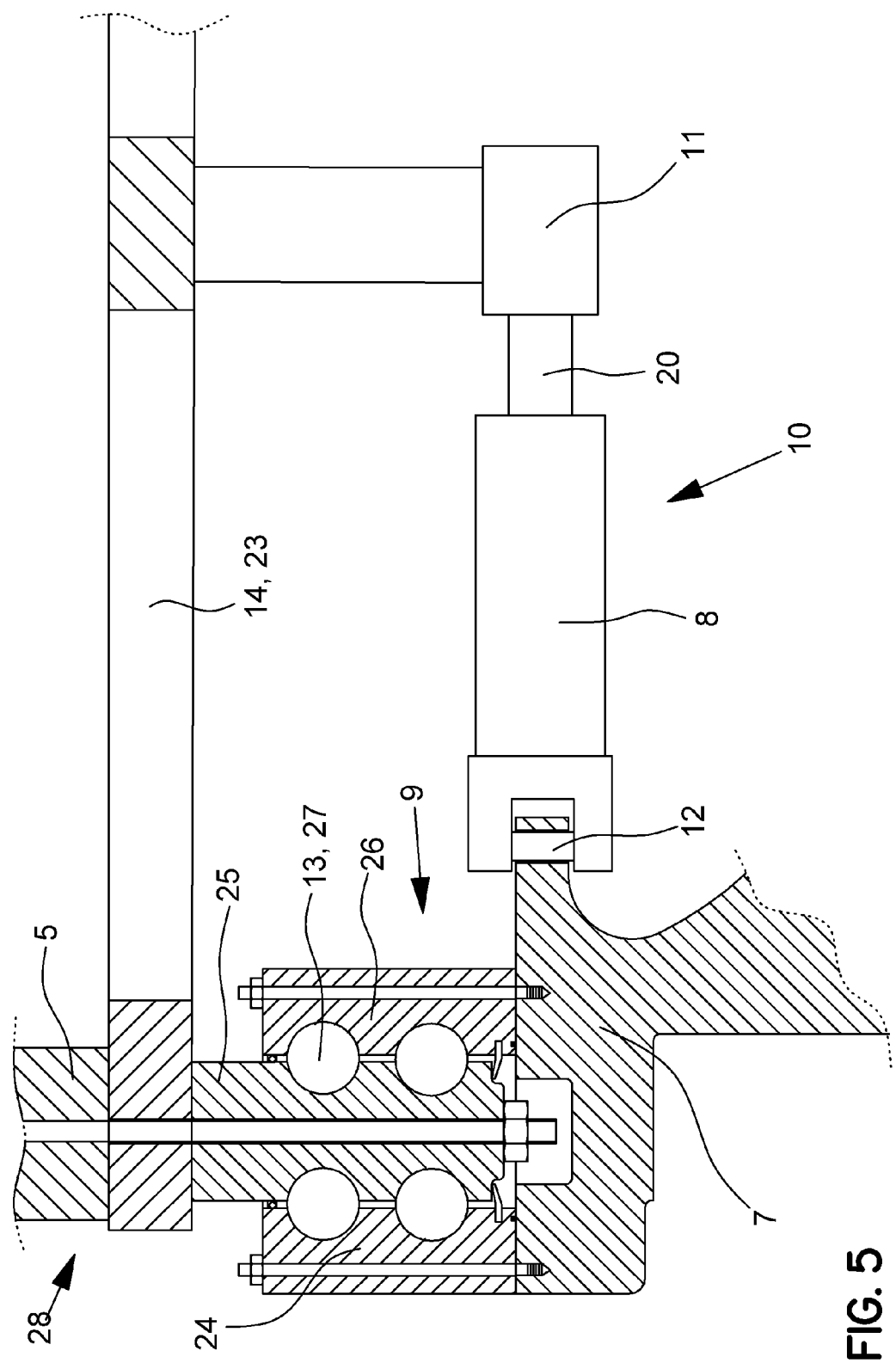
FIG. 5 illustrates a section through a the pitch mechanism illustrated in FIG. 4, as seen from the side.

FIG. 5 illustrates a section through the pitch mechanism shown in FIG. 4, as seen from the side.

In this embodiment, the blade 5 is rotatably connected to the hub 7 by means of a three ring pitch bearing 9 comprising a inner ring 26, a centre ring 25 and a outer ring 24. The bearing rings 24, 25, 26 are arranged so that the centre ring 25 is radially displaced outwards in relation to the inner ring 26 and the outer ring 24 is radially displaced outwards in relation to the centre ring 25.

However, in another embodiment, the blade 5 could be rotatably connected to the hub 7 by means of a traditional two ring pitch bearing 9 comprising only an inner ring 26 and a radially displaced but concentric outer ring 24, wherein between one or more rows 27 of rolling elements 13 are arranged.

In this embodiment, two rows 27 of rolling elements 13, in the form of balls, are arranged between the inner ring 26 and the centre ring 25 and two rows 27 of rolling elements 13 are arranged between the centre ring 25 and the outer ring 24. However, in another embodiment, another number of rows 27 could be arranged between the inner ring 26 and the centre ring 25 and between the centre ring 25 and the outer ring 24, such as one row, three rows, four rows or more, or the number of rows 27 between the inner ring 26 and the centre ring 25 could be different from the number of rows 27 between the centre ring 25 and the outer ring 24.

In this embodiment, the outer ring 24 and the inner ring 26 are rigidly connected to the hub 7 so that the outer ring 24 and the inner ring 26 are mutually fixed and thereby substantially unable to move in both the radial and the axial direction in relation to each other. This entails that the wind load acting on the blade 5 will push the centre ring 25 against the inner ring 26 at the front part of the pitch bearing 9 for a traditional horizontal axis upwind wind turbine 1. This great radial load is transferred to the hub 7 through the inner ring 26, but it will also try to pull the centre ring 25 away from the outer ring 24 at the front part thereby increasing the risk of the pitch bearing unit being damaged. If the inner ring 26 and the outer ring 24 are rigidly connected, the distance between the inner surface of the outer ring 24 and the outer surface of the inner ring 26 is maintained substantially constant at all times, thereby reducing the risk of malfunction or damage.

Furthermore, if the outer ring 24 and the inner ring 26 are rigidly connected, the abovementioned load will be transferred by the inner ring 26 at the front part of the pitch bearing 9 and by the outer ring 24 at the bearing part closest to the nacelle 3 substantially without the outer ring 24 and the inner ring 26 being mutually displaced. Accordingly, even though this load would force the rings 24, 25, 26 into a slightly oval shape in one direction and the multiple hydraulic pitch cylinders 10 will try to deform the pitch bearing 9 in another direction, the rigidly connected inner ring 26 and outer ring 24 will still be able to guide the centre ring 25 so that the deformations are accepted.

It should be emphasised that the term "rigidly connected" is to be understood as the at least one outer ring 24 and the at least one inner ring 26 being substantially inflexibly fixed in relation to each other, i.e., neither of the rings 24, 26 can rotate or move radial or axially in relation to the other.

By connecting the inner ring 26 and the outer ring 24 to the hub 7 and the centre ring to the blade 5 is enabled an advantageous design regarding the transferring of the loads from the blade 5 to the hub 7, in that it is easier to ensure a rigid design of the hub 7, which can provide for a strong and rigid connection between an outer and an inner ring 24, 26 of the three ring pitch bearing 9. This is also advantageous in that the weight of the material needed to make such a strong and rigid connection is moved closer to the centre of rotation, thereby reducing the loads on the hub 7.

Furthermore, by transferring the load of the blade 5 to the hub 7 through the concentric load transferring surfaces of both the inner ring 26 and the outer ring 24, the load of and from the blade 5 and the pitch bearing 9 can be distributed over a larger area of the hub 7, thereby reducing the risk of unwanted load concentrations in the hub 7.

In this embodiment, all three bearing rings 24, 25, 26 are monolithically formed, but in another embodiment, some or all of the bearing rings 24, 25, 26 could be subdivided into two, three, four or more separate ring parts which could be held together by the connector or connecting means connecting the centre ring 25 to the blade 5 and connecting the inner ring 26 and the outer ring 24 to the hub 7, or visa versa.

In this embodiment, the centre ring 25 is indirectly connected to the blade 5 through a connection part 14. In another embodiment, the centre ring 25 could be connected directly to the blade 5 or the bearing 9 could be "flipped" so that the outer ring 24 and the inner ring 26 are rigidly connected to the blade 5 and the centre ring 25 is connected to the hub 7.

In this embodiment, the hydraulic cylinders 10 are arranged in close proximity of the pitch bearing 9 in that the hydraulic cylinders 10 are connected to the hub 7 right below the pitch bearing 9. Hereby, the distance between the blade 5 and the hydraulic cylinders 10 is reduced so that the torque in an axial plane through the length of the cylinder 10 is reduced. However, in another embodiment, the hydraulic cylinders 10 could be mounted even closer to the pitch bearing 8 and the blade 5, for example, by being connected directly to the inside surface of the inner ring 26, or the hydraulic cylinders 10 could be mounted further away from the pitch bearing 9, for example, to provide more space for the hydraulic cylinders 10.

Figure 6:
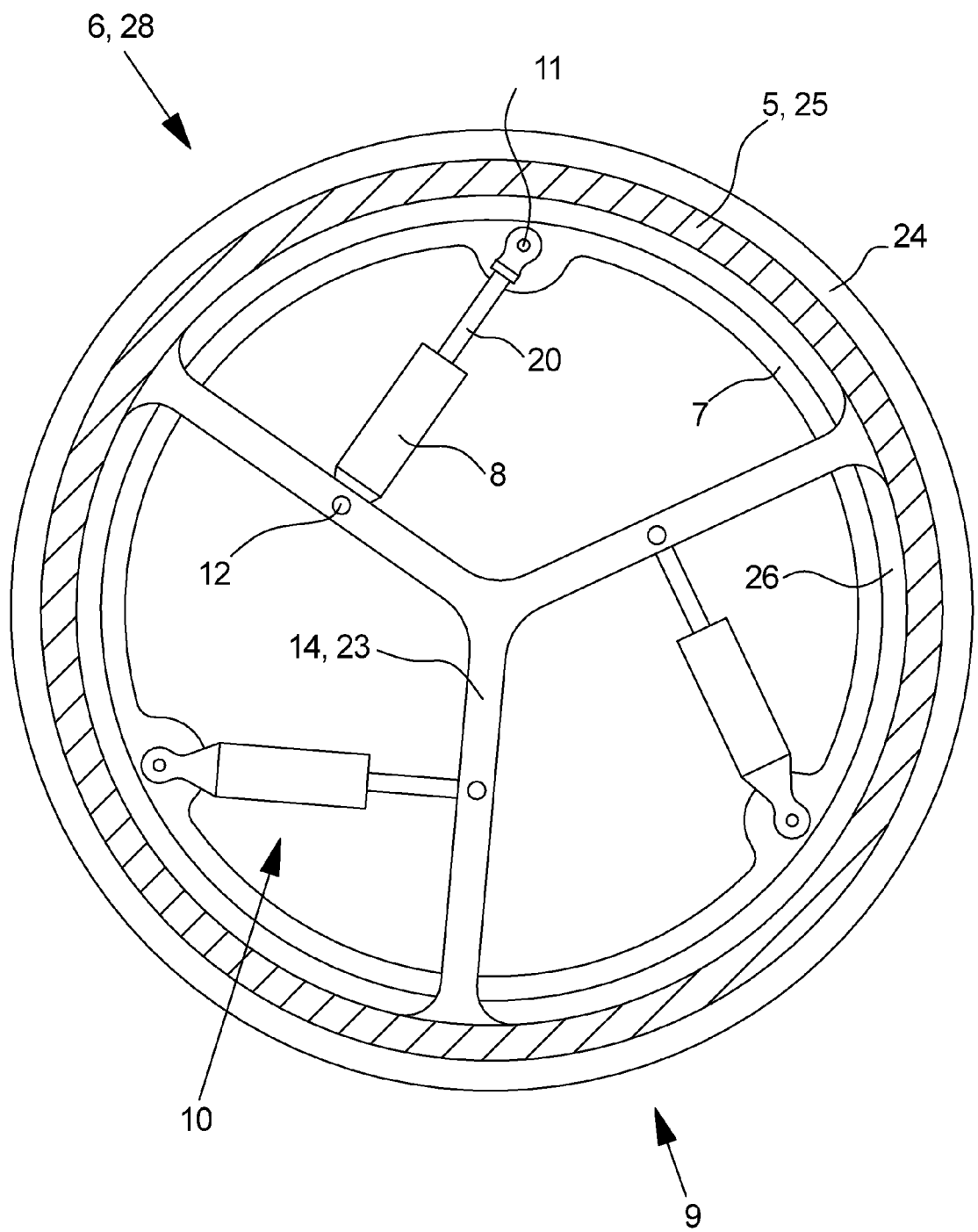
FIG. 6 illustrates a pitch mechanism with a reversed hydraulic cylinder as seen from the top.

FIG. 6 illustrates a pitch mechanism 6 with a reversed hydraulic cylinder 10, as seen from the top.

In this embodiment, one of the three hydraulic cylinders 10 is mounted in a reverse position so that the piston end 11 of the cylinder 10 is connected to the hub 7 instead of indirectly to the blade 5 like the other two cylinders 10 are. It should be noted that even though some of the cylinders 10 are mounted in a reverse position, all the cylinders 10 still have to expand in the same angular direction to rotate the blade 5 in a counter-clockwise direction, i.e., for all the cylinders 10 to expand it is still the rear chamber 22 of all the cylinders 10 that has to be pressurized.

Figure 7:
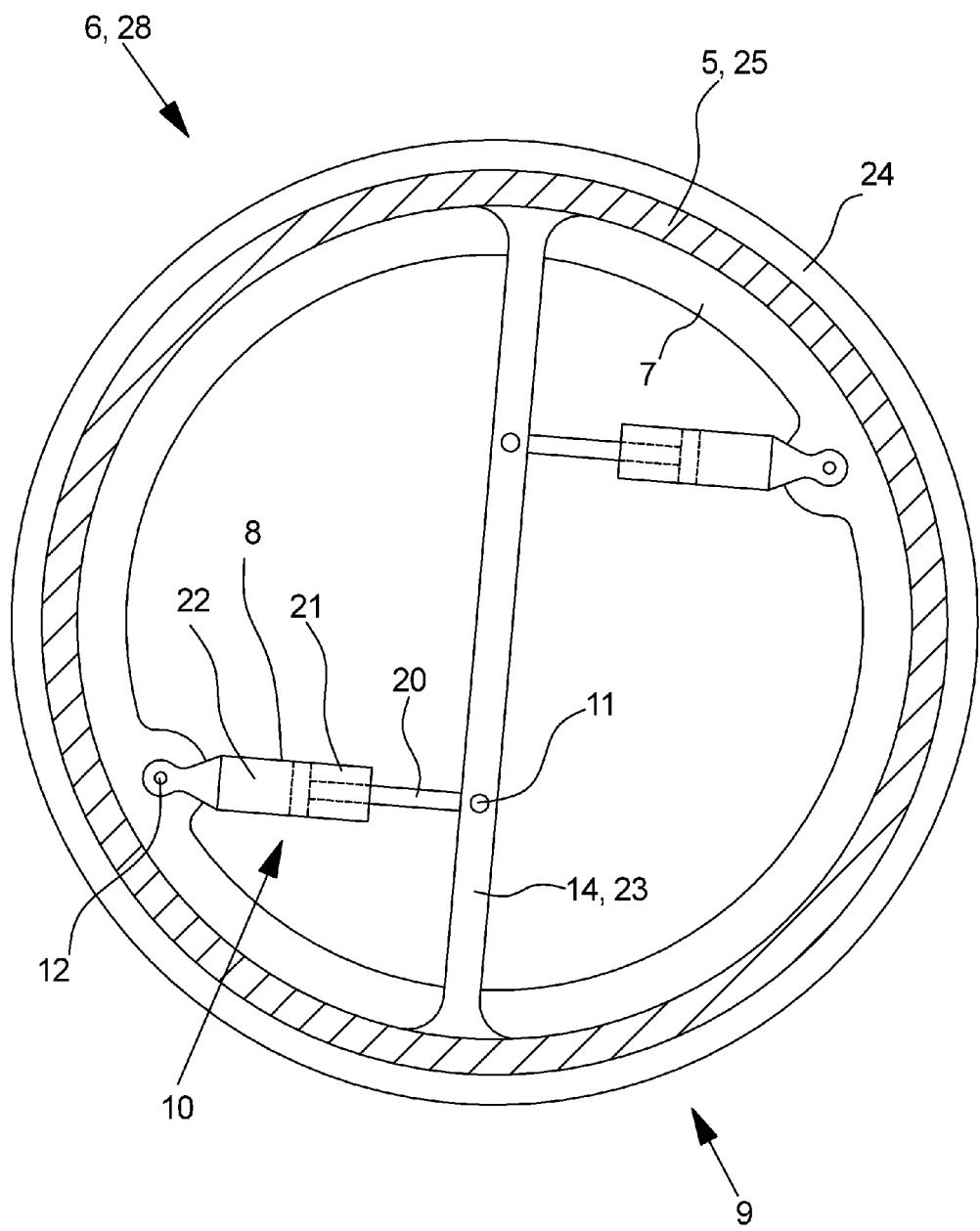
FIG. 7 illustrates an embodiment of a pitch mechanism comprising two hydraulic cylinders as seen from the top.

FIG. 7 illustrates an embodiment of a pitch mechanism 3 comprising two hydraulic cylinders 10, as seen from the top.

In this embodiment, the pitch mechanism 6 only comprises two hydraulic pitch cylinders 10, which are arranged so that they attack the blade 5 through a connection part 14, acting as a lever gear 23, on opposite sides of the rotational axis of the pitch bearing 9. Even though the cylinders 10 are arranged physically in parallel, they do act in the same angular direction in relation to the rotational axis of the pitch bearing 9.

In this embodiment, the pitch bearing 9 is a standard two-ring bearing wherein the outer ring 24 is connected to the hub 7 and the inner ring 26 is connected to the blade 5 and the connection part 14.

In this embodiment, the connection part 14 is formed as a transverse diameter rod and in FIGS. 4 and 6, the connection part 14 is formed as a three legged structure. In another embodiment, however, the connection part 14 could be formed as lattice work, as a round solid plate, as a round plate comprising a centre hole, or as some other structure suitable for connecting hydraulic pitch cylinders 10 to a wind turbine and, for example, at the same time act as a lever gear 23.

The invention has been exemplified above with reference to specific examples of designs and embodiments of wind turbines 1, pitch bearings 9, hydraulic cylinders 10 and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Pitch mechanism
7. Hub
8. Cylinder housing
9. Pitch bearing
10. Hydraulic cylinder
11. Piston end
12. Cylinder housing end
13. Rolling elements
14. Connection part
15. Gearbox
16. Brake
17. Generator
18. Converter
19. Nacelle structure
20. Piston rod
21. Front chamber
22. Rear chamber
23. Lever gear
24. Outer ring
25. Centre ring
26. Inner ring
27. Rolling element row
28. Blade assembly

The invention claimed is:

1. A wind turbine, comprising:
   at least one wind turbine blade assembly, the at least one blade assembly comprising:
   a hub;
   a blade;
   a pitch bearing arranged between the blade and the hub and defining a rotational axis;
   a connection part arranged between the pitch bearing and the blade and being coupled to the blade such that rotation of the connection part causes a corresponding rotation of the blade; and
   two or more hydraulic pitch cylinders for pitching the blade in relation to the hub, wherein the two or more hydraulic pitch cylinders each comprise a first point of attack being fixed towards the blade and a second point of attack being fixed towards the hub,
   wherein the connection part operates as a lever gear comprising an annular ring and two or more discrete, circumferentially-spaced extension members each extending from the rotational axis to the annular ring, the first point of attack of each of the hydraulic pitch cylinders being fixed towards a respective extension member; and
   wherein the two or more hydraulic pitch cylinders are arranged to expand in the same angular direction around the rotational axis of the pitch bearing.

2. The wind turbine according to claim 1, wherein the two or more hydraulic pitch cylinders are evenly distributed around the rotational axis of the pitch bearing.

3. The wind turbine according to claim 1, wherein the two or more hydraulic pitch cylinders are suspended directly between the same two parts.

4. The wind turbine according to claim 1, wherein the blade assembly includes three individual hydraulic pitch cylinders.

5. The wind turbine according to claim 1, wherein the two or more hydraulic pitch cylinders are rotatably connected to the hub and rotatably connected to the blade.

6. The wind turbine according to claim 5, wherein one of the hydraulic pitch cylinders' point of attack is located at a radial distance of between 10% and 90% of the outer radius of the pitch bearing from the rotational axis of the pitch bearing.

7. The wind turbine according to claim 6, wherein the one of the hydraulic pitch cylinders' point of attack is located at a radial distance of between 20% and 80% of the outer radius of the pitch bearing from the rotational axis of the pitch bearing.

8. The wind turbine according to claim 6, wherein the one of the hydraulic pitch cylinders' point of attack is located at a radial distance of between 30% and 70% of the outer radius of the pitch bearing from the rotational axis of the pitch bearing.

9. The wind turbine according to claim 1, wherein the two or more hydraulic pitch cylinders all have substantially the same stroke.

10. The wind turbine according to claim 1, wherein the two or more hydraulic pitch cylinders all have substantially the same diameter.

11. The wind turbine according to claim 1, wherein the two or more hydraulic pitch cylinders are arranged at or adjacent to the pitch bearing.

12. The wind turbine according to claim 1, wherein the pitch bearing comprises at least one inner ring, at least one centre ring and at least one outer ring, wherein the centre ring is radially displaced outwards in relation to the inner ring and the outer ring is radially displaced outwards in relation to the centre ring and wherein at least one row of rolling elements is arranged between the inner ring and the centre ring and at least one further row of rolling elements is arranged between the centre ring and the outer ring.

13. The wind turbine according to claim 1, wherein the wind turbine further comprises a plurality of valves arranged to hydraulically isolate each of the two or more hydraulic pitch cylinders.

14. The wind turbine according to claim 1, wherein each of the hydraulic pitch cylinders is on a side of the pitch bearing opposite to the connection part.

15. The wind turbine according to claim 1, wherein the connection part comprises an opening between adjacent extension members.

16. The wind turbine according to claim 1, wherein the blade assembly includes two individual pitch cylinders and the connection part includes two extension members about 180 degrees apart.

17. The wind turbine according to claim 1, wherein the blade assembly includes three individual pitch cylinders and the connection part includes three extension members about 120 degrees apart.

18. A method for pitching a blade of a wind turbine, comprising:
  connecting a first end of two or more hydraulic pitch cylinders directly or indirectly to a hub of the wind turbine;
  connecting a second end of the two or more hydraulic pitch cylinders to a connection part arranged between a pitch bearing and the blade, the connection part comprising an annular ring and two or more discrete, circumferentially-spaced extension members each extending from a rotational axis of the pitch bearing to the annular ring, the second end of the two or more hydraulic pitch cylinders being connected to a respective extension member; and
  expanding or contracting the two or more hydraulic pitch cylinders in the same angular direction in relation to the rotational axis of a pitch bearing of the blade.

* * * * *